United States Patent [19]

Vogel

[11] 4,312,072
[45] Jan. 19, 1982

[54] RADIO FREQUENCY TRANSMISSION SYSTEM

[75] Inventor: Klaus Vogel, Gelting, Fed. Rep. of Germany

[73] Assignee: Siemens Aktiengesellschaft, Berlin & Munich, Fed. Rep. of Germany

[21] Appl. No.: 108,460

[22] Filed: Dec. 31, 1979

[30] Foreign Application Priority Data

Jan. 17, 1979 [DE] Fed. Rep. of Germany ....... 2901670

[51] Int. Cl.³ .............................................. H04L 7/06
[52] U.S. Cl. ........................................ 375/1; 375/80; 375/103; 455/29; 455/42
[58] Field of Search ...................... 375/1, 2, 96, 45, 46, 375/80; 455/1, 29, 42, 313, 323, 18, 95, 167, 242; 329/102, 103, 104; 331/4, 19; 332/1, 9 R, 10; 340/348; 343/59 A, 121

[56] References Cited

U.S. PATENT DOCUMENTS

| | | | |
|---|---|---|---|
| 2,833,857 | 5/1958 | Robin | 375/45 |
| 3,387,220 | 6/1968 | Lender | 375/95 |
| 3,484,693 | 12/1969 | Fong | 375/1 |
| 3,679,983 | 7/1972 | Theriot | 375/99 |
| 4,064,361 | 12/1977 | Kustka | 375/96 |
| 4,209,750 | 6/1980 | Freitas | 375/1 |

Primary Examiner—Benedict V. Safourek
Assistant Examiner—Stephen Chin
Attorney, Agent, or Firm—Hill, Van Santen, Steadman, Chiara & Simpson

[57] ABSTRACT

Radio transmission system in which the carrier frequency oscillator at the transmitter is wobbulated by varying its frequency in a periodic manner and modulated and transmitted to a receiving site where the detected signal is passed through two separate paths, one being supplied to a converter and the other is supplied to the converter through a delay line. The output of the converter comprises an intermediate frequency which contains the modulation which is then demodulated and detected. Modification of the invention provides for transmitting two or more separate intelligences on the carrier and detecting the two intelligences at the receiver.

16 Claims, 15 Drawing Figures

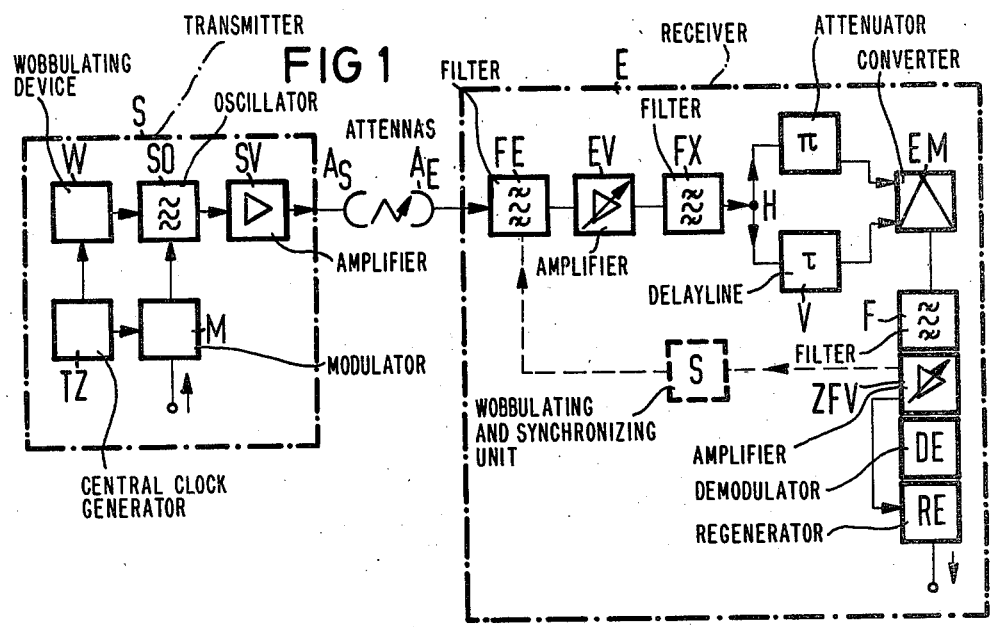
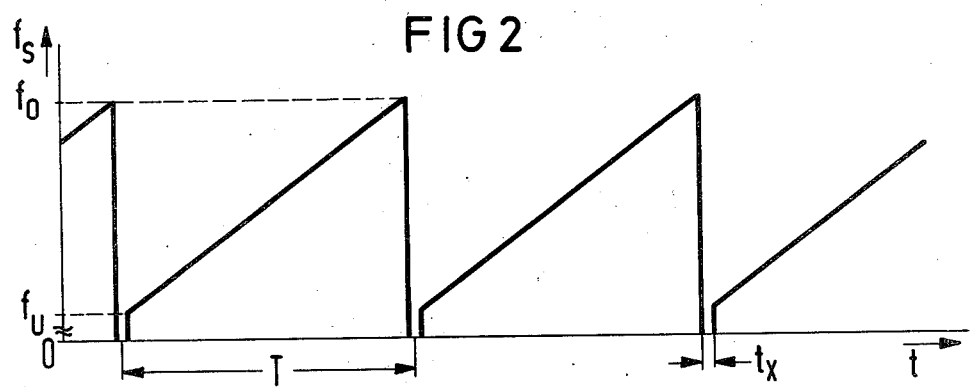
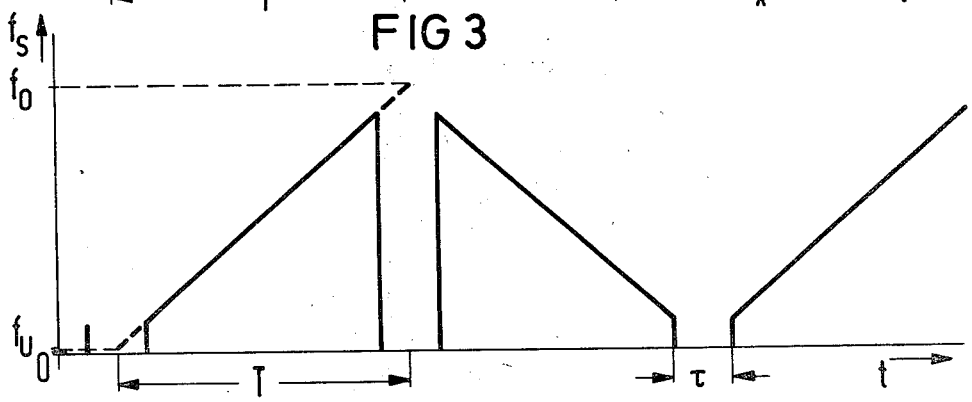

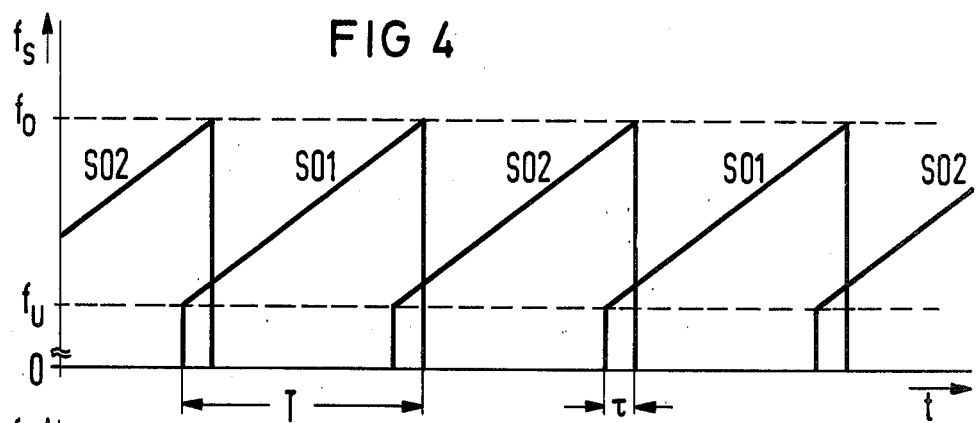
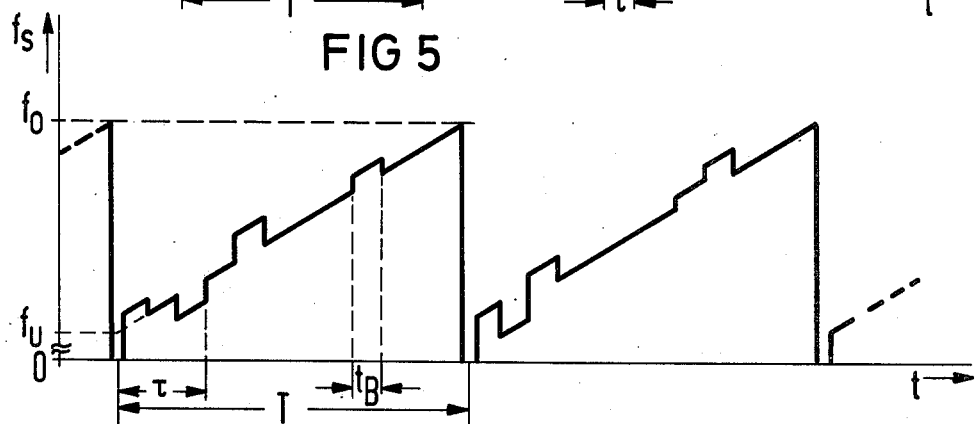
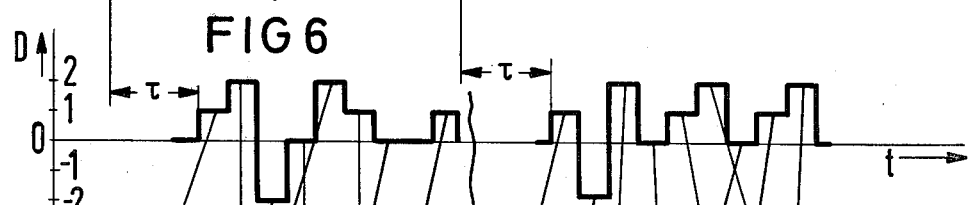
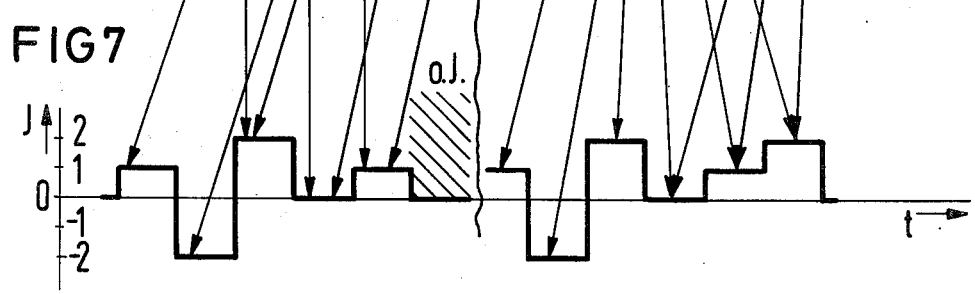

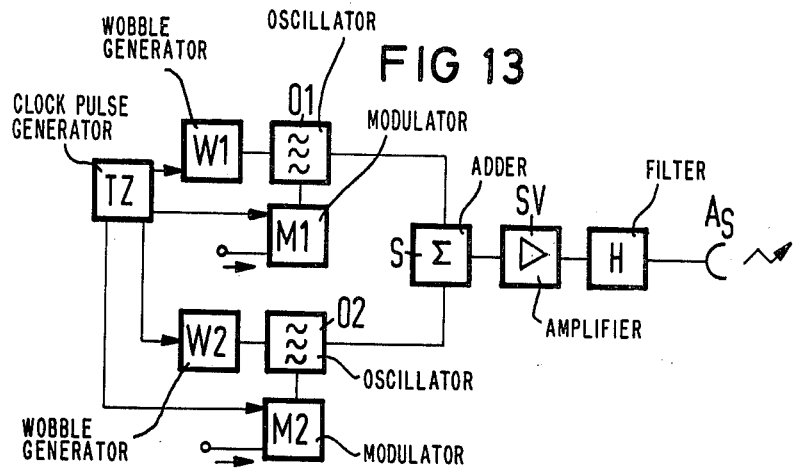
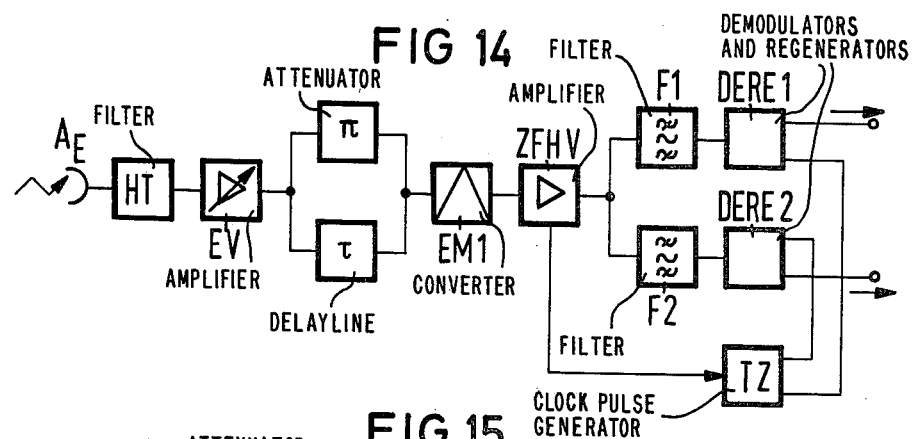
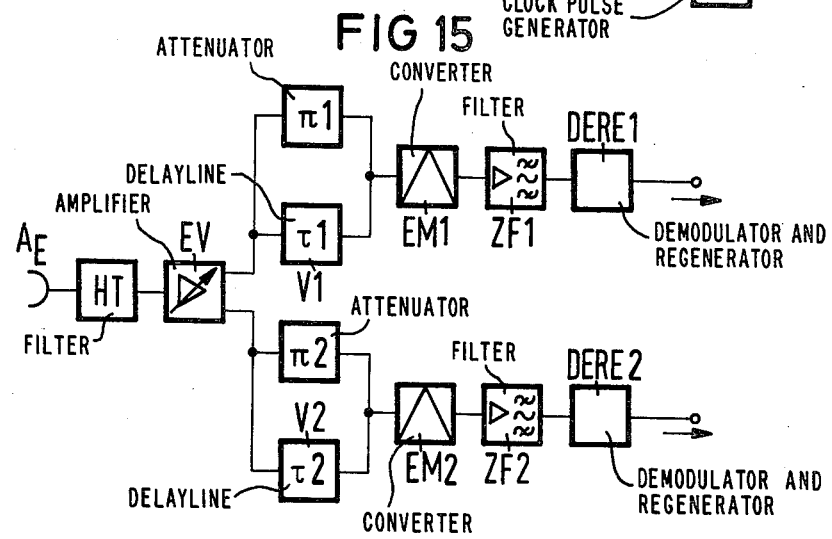

RADIO FREQUENCY TRANSMISSION SYSTEM

BACKGROUND OF THE INVENTION

1. Field of the Invention

This invention relates in general to radio intelligence transmission and receiving systems for very short electrical magnetic waves, wherein a transmitter is provided in which intelligence to be transmitted is modulated onto a carrier and then radiated from a transmitting antenna to a receiving antenna which is connected to a receiver that converts the incoming intelligence into an intermediate frequency band and then demodulates it.

2. Description of the Prior Art

Radio frequency transmitting and receiving systems are well known, but the present invention relates to a novel transmitting and receiving system.

SUMMARY OF THE INVENTION

The present invention provides a solution for the transmission of intelligence in a radio transmitting system, wherein there are many transmitters and receivers operating in the same frequency range, and wherein the system of the invention eliminates interference between such systems and provides very little interference to other systems, and which provides transmitters and receivers which are relatively inexpensive.

In the invention, the transmitted signal is modulated onto a carrier at the transmitter and the carrier is varied in frequency in a time repetitive manner over a predetermined frequency range, and the receiver includes a converter which provides a constant intermediate frequency which contains the modulation. In the receiver a converter is provided which directly receives the incoming signal and also receives the incoming signal through a delay line. The converter provides the intermediate frequency signal, which signal is then filtered, amplified and demodulated to provide the output intelligence.

Other objects, features and advantages of the invention will be readily apparent from the following description of certain preferred embodiments thereof taken in conjunction with the accompanying drawings, although variations and modifications may be effected without departing from the spirit and scope of the novel concepts of the disclosure, and in which:

BRIEF DESCRIPTION OF THE DRAWINGS

FIG. 1 illustrates the intelligence transmitting and receiving system in a simplified block diagram;

FIG. 2 is a plot of frequency versus time for a first manner of changing the transmitted frequency;

FIG. 3 is a plot of frequency versus time for a second manner of varying the transmitted frequency;

FIG. 4 is a plot of frequency versus time illustrating a third method of shifting the frequency at the transmitter;

FIG. 5 is a plot of frequency versus time illustrating FSK modulation using frequency wobbulation such as illustrated in FIG. 2;

FIG. 6 illustrates the output of the intermediate frequency demodulator at the receiver;

FIG. 7 is a plot of the received intelligence;

FIG. 13 illustrates another embodiment of the transmitter of the invention;

FIG. 14 illustrates another embodiment of the receiver of the invention; and

FIG. 15 illustrates a further embodiment of a receiver according to the invention.

DESCRIPTION OF THE PREFERRED EMBODIMENTS

Figure 8:
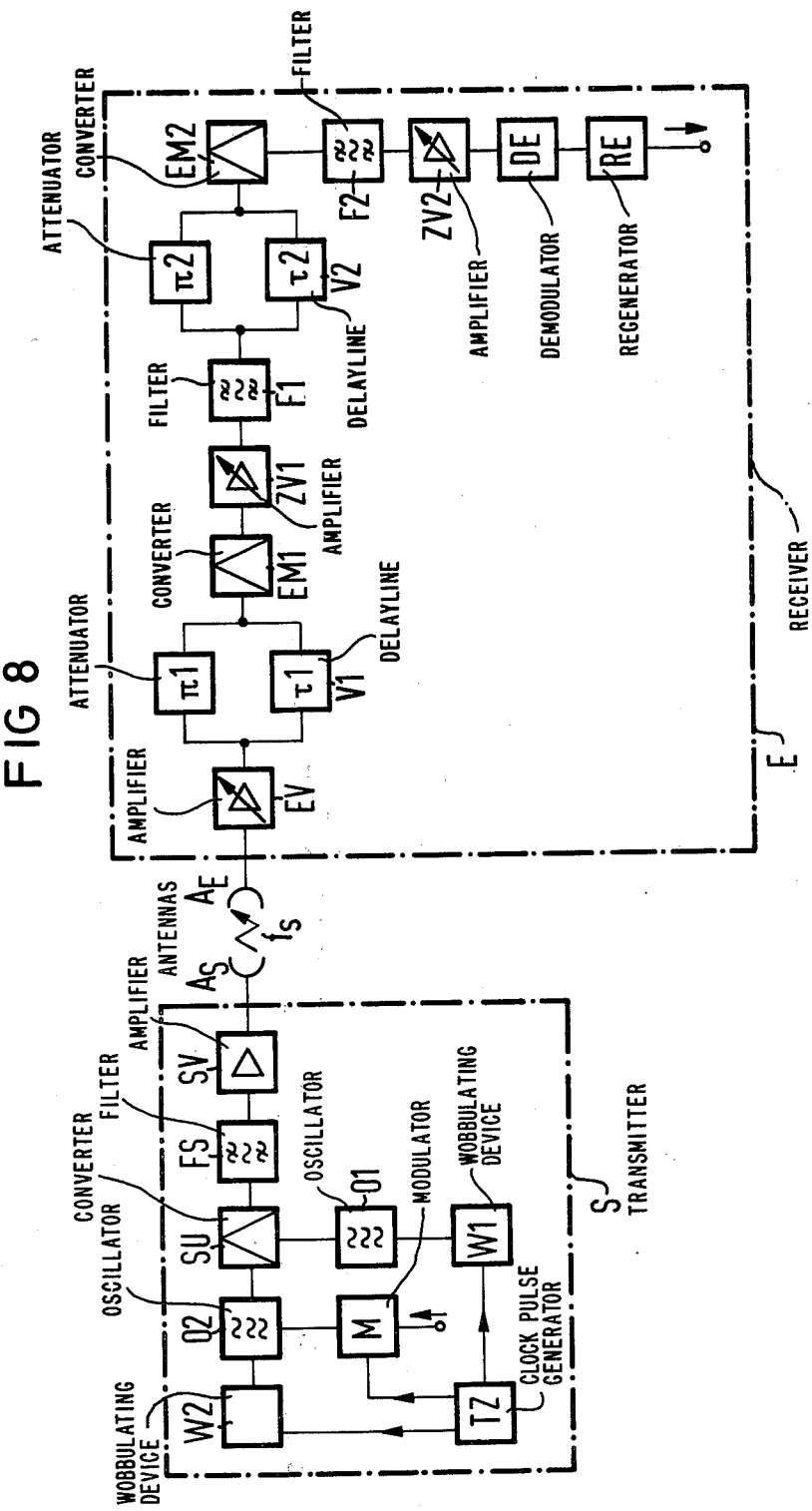
FIG. 8 is a block diagram of a modification of the invention.

FIG. 1 illustrates the radio transmitting and receiving system according to the invention in a simplified form, wherein the transmitter S is connected to a radiating antenna $A_S$. A radio link is provided between the transmitter and the receiver which has a receiving antenna $A_E$ which is connected to the receiver E.

The transmitter S includes a transmitting oscillator SO which provides an output to a transmitting amplifier SV which is connected to the antenna $A_S$. The amplifier SV may be a wide band amplifier such as, for example, a travelling wave tube. The transmitting oscillator SO is varied in frequency by a wobbulating device W, and is modulated by a modulation unit M which might provide AM, ASK, FM or FSK modulation. A timing central clock generator TZ provides inputs to the wobbulating device W and the modulator M. THe modulator receives input intelligence at its input terminal as shown.

At the receiver the incoming signal from the antenna $A_E$ is supplied to a receiving filter FE which supplies an output to a wide band linear low noise regulated amplifier EV, which amplifies the received signal to a level of, for example, 10 mW. The amplifier EV supplies an output to a filter FX which supplies an input to a separating branch H. A portion of the signal at this point is supplied to an attenuator $\pi$ and another portion of the signal is supplied to a delay line V which has a delay of $\tau$. A receiving converter EM receives the output of the attenuator $\pi$ and the delay line V. The delay line V has a constant group transit time delay of $\tau$. The delay line V can, for example, comprise a long cable with as high as possible $\epsilon_r$, or may comprise a plurality of lines of concentrated elements. It is to be realized that at the input of the converter EM there exists a time delay between the signals between the two paths of $\tau$. Due to the time linear wobbulation of the signal being received at the receiving converter EM, a constant intermediate frequency will occur of:

$$f_{ZF} = \frac{(\pm f_o \mp f_u)}{T} \cdot \tau = K \cdot \tau$$

The stability and precision of the intermediate frequency $f_{ZF}$ is determined by the stability of the wobbulating frequency K (MHz/sec) and the transit time $\tau$ which is independent of frequency. In discontinuous points of the transmitted frequency, the intermediate frequency will be blanked for the time of $t_x$ or $\tau$ as illustrated in FIGS. 2 or 3.

The intermediate frequency $f_{ZF}$ existing in the receiver occurs because of the collective effect of the delay line V and does not require that the receiver have a carrier injection oscillator and the intermediate frequency is filtered by the filter F and passed to the amplifier which follows ZFV. When the transmitted signal at the transmitter is modulated, the signal from amplifier ZFV will be demodulated by the demodulator DE which is connected to the output of the amplifier ZFV and if, for example, the transmitted intelligence is in digital form, it will be regenerated by the regenerator RE which is connected to the output of the demodulator DE. Connected between the intermediate frequency amplifier ZFV and the input filter FE is a wobbulating and synchronizing unit S which can control the pass band of the filter FE synchronously with the received RF frequency over the wobble range of the transmitter oscillator SO.

FIGS. 2, 3 and 4 illustrate different forms of the modulation and wobbulation wherein the transmitted frequencies are shown without modulation. To the extent that it is possible that transmitting frequency is linearly wobbled relative to time over a period of T between the frequencies $f_u$ and $f_o$. The difference in these frequencies $f_o-f_u$ can amount to several GHz. The points of this continuity in the wobble curves as shown in FIGS. 2 and 3 represent brief times when the transmitting oscillator is blanked or turned off. For example, in FIG. 2, the transmitter does not radiate for a very short time of $t_x$. In FIG. 3, the transmitter oscillator does not radiate during the time $\tau$ as illustrated. In FIG. 4, the frequency of the transmitter is produced by two different oscillators which overlap for a period of $\tau$ as shown. Thus, in the example of FIG. 4, the second oscillator is connected to the antenna before the first oscillator has reached its upper frequency of $f_o$.

For the determination of the intermediate frequency, the parameters transit time $\tau$, wobble speed K and wobble time T as well as the upper and lower frequency $f_o$ and $f_u$ are determinative. In a particular case of selecting these parameters, it should be realized that the interference with other systems in the same frequency range becomes less for the shorter duration that the transmitting frequency remains in the distorted band and the longer the wobble time T. Thus, the wobble band width ($f_o-f_u$) compared to the distorted base band measuring channels of the distorted system as, for example, a carrier frequency channel of 3.1 kHz will be selected to be as large as possible and K will be selected to be as high as possible. In principle, the wobble speed K can be selected to be so high that other systems located in the same band will no longer be distorted.

The short delay cables which are necessary for short transit times $\tau$ are commercially available or can be constructed in a simple manner. The intermediate frequency to be selected is chosen to be sufficiently high relative to the information quantity to be transmitted and is determined by the selection of K and $\tau$.

In FIG. 2, for example, the transmitted frequency sweeps from a frequency of $f_u$ linearly up to the frequency $f_o$ and then drops for a short period of $t_x$ to zero and is then started again at $f_u$ and so forth.

In FIG. 3, the frequency is wobbulated upwardly and then after a short off time is wobbulated downwardly in the frequency and so forth. FIG. 4 illustrates two oscillators which are wobbulated from the low frequency of $f_u$ up to higher frequency $f_o$ and the two oscillators overlap as shown.

FIG. 5 is a plot of modulation such as illustrated in FIG. 2 wherein intelligence is modulated on to the carrier using a two stage FSK modulation. FM and AM modulation can also be utilized with suitable FM and AM modulation equipment. The FSK modulation is modulated on the curve of FIG. 2 and FIG. 5.

When modulation of the signal illustrated in FIG. 3 occur, since the wobbulating frequency first goes up and then comes down the sign of the wobble speed changes and also the direction of modulation is reversed between adjacent periods T.

As shown in FIG. 5, the wobble period T is selected to be four times the delay time $\tau$. In the case of a whole number ratio of these values, it is advantageous to use a set clock pulse ratio. For the same reason, it is desirable if the bit-clock pulse time $t_B$ has a whole number ratio to the wobble period T and to the transmit time $\tau$. For example, if $\tau = 3 \cdot t_B = T/4$. Then, during the time when there is no intermediate frequency at the beginning of each wobble period, regeneration of the values T and $t_B$ can occur.

It is to be realized that in the invention many different kinds of modulations and regeneration for radio transmission systems can be utilized and the following or specific examples but are not exhaustive of the various possibilities of the invention.

In varying the transmitted frequency at a wobble speed to K, the wobble period T comprises the clock pulse time of the modulation. K or wobble speed can be varied for each individual wobble period corresponding to the condition of the stage and the bit content of the FSK modulation. In the receiver, the intermediate frequency pulses arise with the clock pulse T and the FSK modulation content of the signal being transmitted.

In the example when the modulation corresponds to that illustrated in FIG. 5 shown in the first of the periods T, five separate bits are transmitted. In the modulated signal, each information bit follows a "empty bit." At the intermediate frequency demodulator at the receiver, then the signal content illustrated in FIG. 6 occurs. This signal is distorted by the transit time $\tau$ in the receiver; nevertheless, in a simple manner, this signal can be equalized. This is indicated by the arrows which extend from FIG. 6 to FIG. 7. FIG. 7 illustrates the undistorted information. At the end of the wobble process during a time span which is indicated as shaded and designated oj (without content) no information will be transmitted.

Referring again to FIG. 5 during the second wobble period following the first one, portions of the period designated as $\tau$ alternate periodically, within each case three information bits, and those without information content. This allows the control for the signal regeneration to be simplified.

The bit flow rate in the transmitter can be distorted such that in the receiver after the transit time distortion by means of the delay line V and after the demodulation in the demodulator DE, the correct information automatically occurs.

Figure 10:
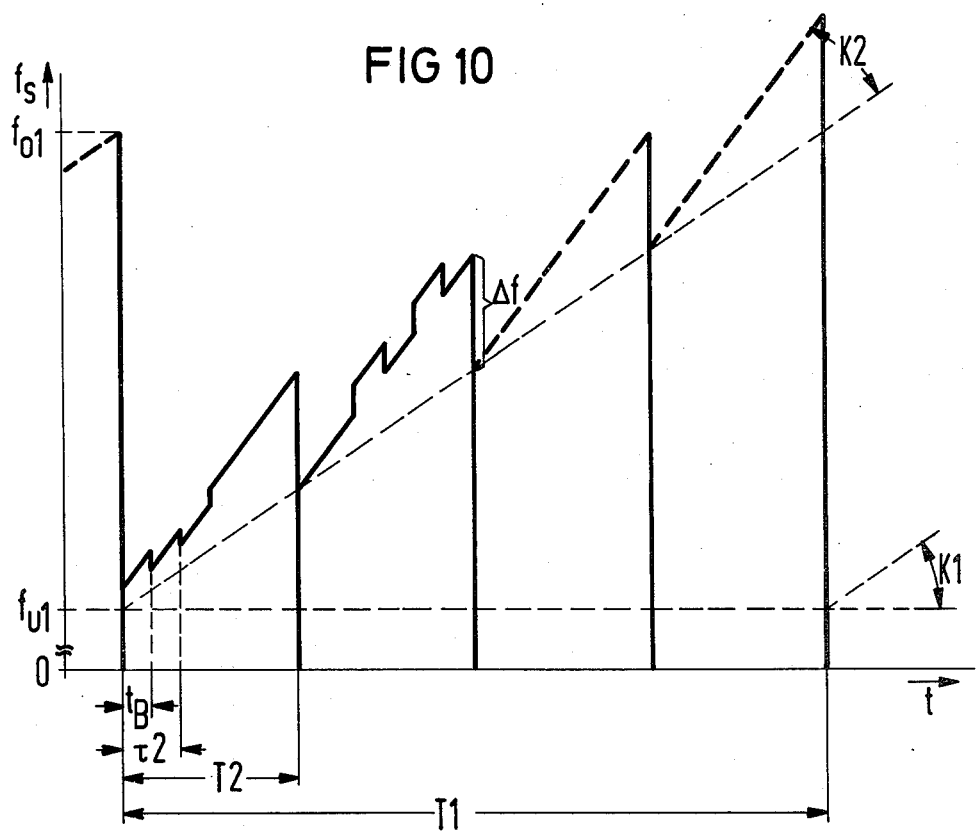
FIG. 10 is a plot of frequency versus time for the system illustrated in FIG. 8 using FSK modulation.

FIG. 8 is a block diagram of a modified form of the invention, which utilizes two delay lines in the receiver. By using more than one delay line in the receiver E, interference with respect to intentional outside interferrers and the security against interception of the transmitted data is improved. In the embodiment illustrated in FIG. 8 where like elements shown in FIG. 1 are designated by similar designations, a pair of oscillators 01 and 02 are connected to a transmitting converter SU, and their outputs superimposed. The converter SU may be a wide band single side band converter. The output of the converter SU is supplied to a transmitter filter FS which applies an output to the transmitting amplifier SV, which is connected to the antenna $A_S$. The filter FS and amplifier SV filter and amplify the transmitted signal $f_S$. Both of the oscillators 01 and 02 are wobbulated by wobbulating in its W1 and W2 respectively, and both of these units receive clock pulses from the clock pulse generator TZ. A modulator M receives incoming intelligence and modulates the modulator 02 and also receives an input from the clock pulse generator TZ. The modulation supplied to the modulator M might be FSK modulation. The timing clock generator TZ controls the bit duration $t_B$, the baud rate, and the wobble times T1, T2, and these are controlled in a whole number ratio. For the curve illustrated in FIG. 10, the following values result:

$$T_1 = 2\tau_1$$

$$T_2 = 3\tau_2$$

From this, there follows $$t_B = (\tau_2/2) \text{ for } T_2 = 2nt_B = 6t_B \text{ and}$$

$$T_1 = 2mT_2 = 4T_2.$$

Thus, the modulation can be any of the previously described methods.

In the receiver for the transmitter illustrated in FIG. 8, the wide band amplifier EV supplies inputs to a first attenuator $\pi 1$ and to a first delay line V1 and the output of these two units is supplied through a first receiver converter EM1. A first intermediate frequency amplifer ZV1 connected to the output of the converter EM1 and a first filter F1 connected to the output of the amplifier ZV1. A second parallel circuit comprising a second attenuator $\pi 2$ and a second delay line V2 receive the output of the filter F1, and the outputs of these units are supplied to the input of a second receiver converter EM2. A second filter F2 receives the output of converter EM2 and a second IF amplifier ZV2 receives the output of the filter F2 and supplies an output through a demodulator DE which in turn supplies an output to a regenerator RE. In the receiver, after the first receiving converter EM1, an intermediate frequency is filtered out by the first filter F1, which is $$f_1 = \frac{(f_{o1} - f_{u1})}{T_1} \cdot 1 = K_1 \cdot \tau_1.$$

This intermediate frequency is wobbulated in a time linear fashion at a wobble speed of $K_2 = \Delta f / T_2$. In the second receiver converter EM2, the constant intermediate frequency which carries the FSK modulation exists. This frequency is $f_2 = K_2 \cdot \tau_2$. The output of the second IF filter ZV2 will be free of interference external to the band as well as noise external to the band. The use of the double filters F1 and F2 increases the security against interference by interferring signals from other transmitters which have similar wobble speeds. It is also possible to use different wobble speeds of $K_2, K_3 \ldots K_n$, which change in a programmed manner. In this event in the receiver different transit time arrangements corresponding to the program would be connected in and out of the circuit.

Figure 9:
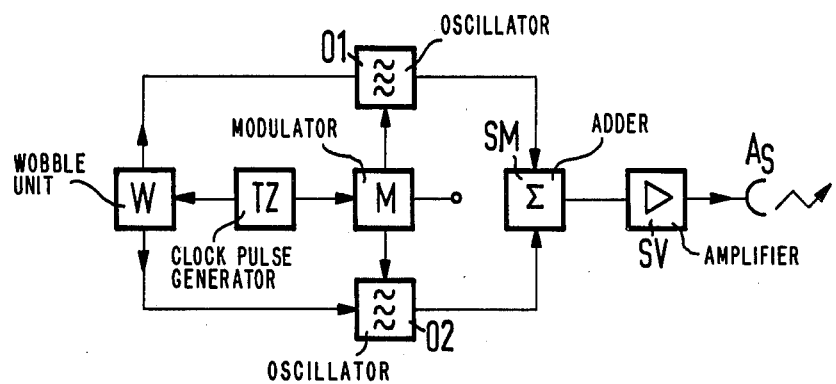
FIG. 9 illustrates a modification of the transmitter.

FIG. 9 is a block diagram illustrating the transmitter S of a transmitting system which has two transmitting oscillator 01 and 02. These oscillators both receive inputs from the modulator M and supply outputs to an adder SM which is connected to the transmitting amplifier SV. The oscillators 01 and 02 are alternately switched on and off by clock pulses from a clock TZ which controls a wobble unit W which is connected to the oscillators. The oscillators are switched on and off alternately corresponding to the curve illustrated in FIG. 4, wherein overlap of the output of the oscillators curves are shown. Both of the oscillators receive the output of the modulator M.

Figure 11:
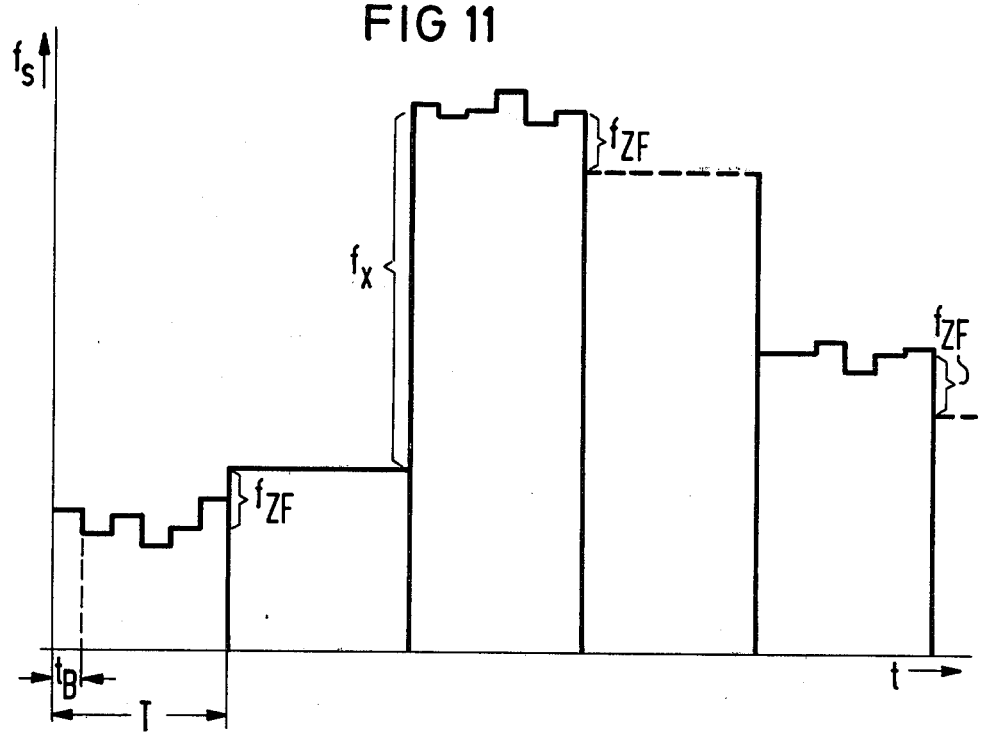
FIG. 11 is a plot of frequency versus time illustrating a modified form of the invention.

FIG. 11 is a plot illustrating a modulated transmitter signal wherein the carrier frequencies change in frequency jumps in a programmed manner. A method wherein the transmitting frequency is programmed as shown in FIG. 11 can be used when collection and dispersion effect occur, and the increased protection against interference of external systems and their susceptibility to interference from other systems can be dispensed. The carrier in the example illustrated in FIG. 11 remains constant over periods T which correspond to the length of the transit time line in the receiver. The carrier frequency changes and jumps by the frequency amount of $f_{ZF}$, which corresponds to the intermediate frequency existing in the receiver. The modulation might, for example, be of the type illustrated in FIG. 5, wherein during partial periods several information bits and signal without information content periodically alternate with one another. After two continuous consecutive modulation periods $\tau$, the carrier frequency can jump by random amounts which, for example, can be related to the interference which exists in the band.

Figure 12:
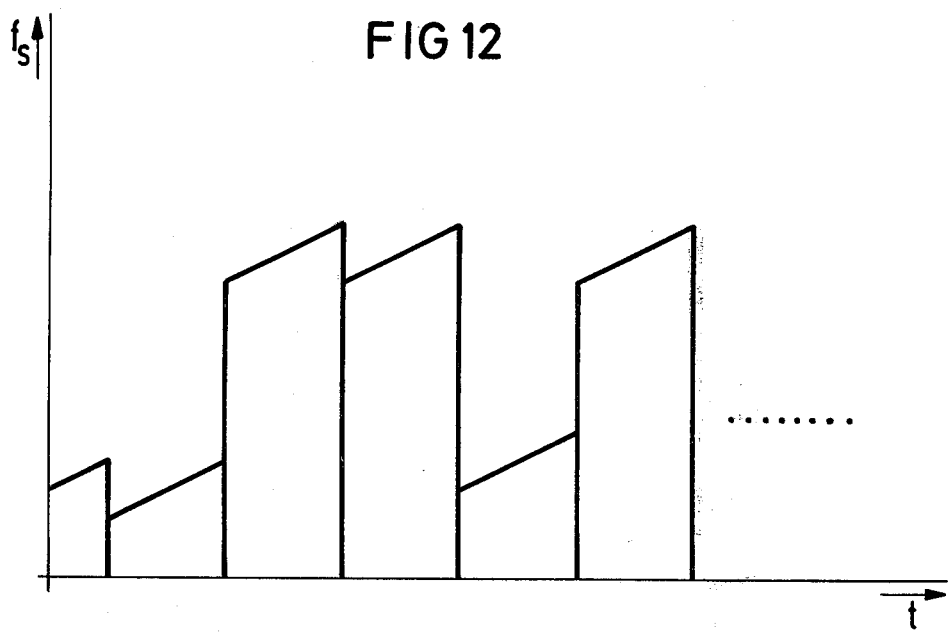
FIG. 12 illustrates a modified form of shifting the frequency at the transmitter wherein a combination of jumps and wobbulation of the transmitted frequency is utilized.

Also, it should be realized that a combination of the different carrier frequency transmitting curves illustrated in FIGS. 2 through 4 and 10 and 11, can be utilized. Such an example is illustrated in FIG. 12, which does not show the information modulation content, but merely shows the changes in the carrier frequency. The carrier frequency changes from period to period and jumps, and increases linearly within a single period.

So as to increase the security against interference, the wobble speed can be reversed, or the frequency can be jumped $f_{ZF}$ in a programmed manner, and at the receiver, the transit times $\tau$ and/or the intermediate frequencies can be switched according to the same program used at the transmitter.

When strong interference occurs, it is possible to avoid over-modulation of the receiver amplifier EV in a system, for example, where a 30 dB interferring signal and obtain the useful signal and to avoid reduction of the receiver sensitivity, and in the case of a synchronized receiver, a relatively wide band easily and quickly controllable receiving filter $F_E$ can be buried in a programmed manner. The products of the frequencies mixing from the interferring and useful signal (the interferring signal has the same wobble speed as the useful signal) can be eliminated with a wide band filter $F_X$ connected after the non-linear receiving amplifier $E_V$.

In systems which customarily transmit several RF radio frequency channels, the available band width is subdivided into RF channels, and in each case a transmitter and a receiver are operated which have relatively high cost due to the selection, carrier supplies and intermediate frequency equipments necessary. The present invention allows the possibility for the common use of modules in all of the transmitters and all of the receivers, and thus, the cost becomes relatively cheap. In the case of the transmission system according to the invention, it is possible to provide for parallel circuiting with greatly reduced filter microwave and intermediate frequency amplifier costs, and also the cost is reduced for FSK modulation with regeneration.

FIG. 13 is an example illustrating the parallel circuit for two transmitting channels. A pair of oscillators 01 and 02 are respectively wobbulated by wobble generators W1 and W2 and are modulated by two modulators M1 and M2 which receive different intelligence. The modulation and wobbulation is controlled by a common master clock pulse generator TZ. The output of the oscillators 01 and 02 are added in an adder S and then the two FSK modulated signals are supplied to a transmitter amplifier SV which is also non-linear and supplied through a high pass filter H to the transmitting antenna $A_S$.

FIGS. 14 and 15 illustrate two separate receivers that can be used with the transmitter of FIG. 13. In FIG. 14, the receiving antenna $A_E$ supplies an input to a high low pass filter HT which supplies an input to a receiving amplifier EV. The output of the amplifier EV is supplied to the parallel attenuators $\pi$, and the delay $\tau$. The output of these units is connected to the input of a receiving converter EM1 which supplies an output to an IF amplifier ZFHV, wherein common amplification of the two intermediate frequencies f1 and f2 occurs. A pair of separating filters separates the two channels at the output of the amplifier ZFHV, and the first filter F1 separates one of the intermediate frequencies F1 and supplies an output to a demodulator and regenerator DERE1. A second filter F2 separates the second intermediate frequency f2 and supplies an output to a demodulator and regenerator DERE2. For both of the channels, a common timing clock pulse generator TC is provided which receives input from the IF amplifier ZFHV and supplies inputs to the demodulator regenerators DERE1 and DERE2.

A modification of the receiver for use with the transmitter 13 is illustrated in FIG. 15, wherein the output of the receiver amplifier EV separates the two channels and supplies a first output to a first attenuator $\pi 1$ and a first delay $\tau 1$ in the delay B1 and a receiver converter EM1 is connected to these units and supplies an output to a first filter ZF1, which supplies an input to the demodulator regulator DERE1, which produces the information from the first channel. A second attenuator $\pi 2$ and second delay V2 also receive outputs from the receiver amplifier EV and supply inputs to a receiver converter EM2, which supplies an output to the filter ZF2 which in turn supplies an output to the demodulator regenerator DERE2 which demodulates the second channel and supplies the output to an output terminal. The delay in its V1 and V2 can be selected so that only constant intermediate frequency occurs in both branches, and thus, neither carrier supplies nor microwave receiving filters of the customary type are required for transmitting intelligence.

The transmitting methods according to the invention are suited for multiplicity of applications, for example, for transmission systems for mobile equipment which are distortable only with difficulty and can be located by third parties only with relative difficulty. The invention can be used also for transmission devices which can be constructed in parallel lines, or especially since the wobble testing locations having their own intermediate frequency forms which depend upon the wobble speed and the delay time. In the testing receiver of the testing location in other testing and receiving devices, a generation of a receiver carrier frequency is not required.

It will be apparent to those skilled in the art that many modifications and variations may be effected without departing from the spirit and scope of the novel concepts of the present invention.

I claim as my invention:

1. A communications system for electromagnetic waves, consisting of a transmitter, in which the signal to be transmitted is modulated onto a carrier, a transmitting- and a receiving-antenna with a radio linkhop, dispensed therebetween and a receiver in which the received signal is converted into an IF-signal and demodulated, characterized by the following features: the transmitting signal is modulated in the transmitter with an intelligence signal and is controlled in its frequency-time-progression periodically between an upper and a lower frequency boundary by means for signal controlling and processing with at least one carrier oscillator, in such a manner that the absolute value of the frequency difference of the transmitting signal, relative to the times t and $t+\tau$, is constant for all times t within the sweep time T, and there results at the receiving converter of the receiver, a constant intermediate frequency containing the modulation, by virtue of the fact that the amplified receiving signal is separated by two branches, with one branch connected with the one input of the receiving converter, and the other is connected through a delay line, with the other input of the receiving converter, the intermediate frequency of the receiving converter is subsequently supplied to a filter, an amplifier and a demodulator and subsequently the method-conditioned transit time distortion of the intelligence signal is corrected.

2. A radio transmission system according to claim 1, characterized in that the transmitted carrier signal which is modulated with the intelligence is controlled in frequency with a control unit connected to said oscillator to periodically vary its frequency between upper and lower frequency limits such that the frequency varies as a linear function of time over a fixed period.

3. A radio transmission system according to claim 2, characterized in that the transmitted power after each fixed period during which the receiver has maintained a constant intermediate frequency which contains the intelligence is switched off by the control unit for at least one carrier oscillator period for short times which is smaller than the wobble time or for the time $\tau$, which corresponds to the delay time of the delay line in the receiver.

4. A radio transmission system according to claim 1, characterized in that the transmitted carrier signal is produced by the signal addition of the outputs of two oscillators which are alternately switched in and controlled by a common wobble unit, and said two oscillators are controlled between upper and lower frequency limits such that the switch-in time of said two oscillators overlap for a time interval of $\tau$, which corresponds to the delay time of the delay line in the receiver, so that in the receiver an uninterrupted constant intermediate frequency occurs which carries the intelligence.

5. A radio transmission system according to claim 1, characterized in that the transmitted carrier signal which is modulated with the intelligence is controlled by the control unit between upper and lower frequency limits such that the transmitted frequency is always constant within a time period of $\tau$, which corresponds to the length of the time delay of the delay line in the receiver, said transmitter signal is switched very quickly in frequency between consecutive carrier periods, the frequency difference of the transmitted carrier frequency during two consecutive periods is always the same and corresponds to the intermediate frequency of the receiver, and frequency jumps of the carrier between "double" periods can be random or can be selected to follow a selected pattern as required to prevent interfering influences on the receiver due to external transmitters.

6. A radio transmission system according to claim 1, wherein the transmitted carrier signal in the transmitter is produced by a plurality of carrier oscillators, and their output signals combined in steps with mixers such as single side band converters, and filters and said oscillators are controllable separately in frequency and amplitude so that they can be steered independently in frequency and so that they can be modulated with different modulating intelligence, which is decoupled due to the individual carrier oscillator frequencies.

7. A radio transmission system according to claim 1, characterized in that in the receiver, a receiving filter receives the output of the receiving antenna, a wide band amplifier receives the output of said filter and amplifies the sum of the received signals and regulates and limits them to a level which is at such a height such that the receiving converter is not over-driven and so that cross modulation products will be as small as feasible.

8. A radio transmission system according to claim 7, characterized in that a filter is connected to the output of said receiving amplifier which eliminates interfering frequencies which arise due to non-linearity of the amplifier and also eliminates the interfering signals which arrive at the amplifier simultaneously with the intelligence signal.

9. A radio transmission system according to claim 7, characterized in that in the transmitter, the transmitted carrier signal which is modulated with the intelligence signal is controlled by the control unit for at least one carrier oscillator such that in the receiver, a constant intermediate frequency occurs, the amplified received signal is divided into two branches, one branch having a first delay line which is adapted to the transmitted carrier signal, said two branches are connected to first and second inputs of a first receiving converter, and the intermediate frequency of said converter is regulated, amplified and filtered and then is again divided into two branches with one branch having a second delay line which is adapted to the transmitted carrier signal, and these two branches are connected to a pair of inputs of a second converter which has a constant intermediate frequency output which carries the intelligence, and this intermediate frequency is filtered, amplified and demodulated to produce the intelligence.

10. A radio transmission system according to claim 1, characterized in that to the receiving antenna (A) or to receiving amplifier (EV), a controllable selection filter ($F_E$) is connected, which is controlled to follow the wobbled received signal with a synchronizing and control unit (S) in the receiver.

11. A radio transmission system according to claim 1, characterized in that the intelligence signal is modulated onto the transmitted carrier signal in the form of amplitude modulation or ASK modulation.

12. A radio transmission system according to claim 1, characterized in that the intelligence signal is modulated onto the transmitted carrier in the form of frequency modulation or FSK modulation.

13. A radio transmission system according to claim 1, characterized in that the intelligence signal is modulated onto the transmitted carrier signal with combination of AM and/or FM and/or ASK and/or FSK modulations.

14. A radio transmission system according to claim 1, characterized in that the intelligence signal which is to be transmitted is predistorted in the transmitter with a predistorter so that despite system conditioned transit time distortion in the receiver, the undistorted signal will appear at the output of the demodulator.

15. A radio transmission system according to claim 1, characterized in that the intelligence signal is transmitted in pulse code modulation form, a control unit for at least one carrier oscillator is controlled so that the transmitted carrier signal is controlled between upper and lower frequency limits such that the absolute value of the frequency difference $\Delta f$ is a constant at the times t and $t-\tau$, for all times t within the wobble time $\tau$ for a wobble time period T, and these constants represent the bit content of one bit which is to be transmitted and the wobble time T forms the bit length of the bits of the bit current which is to be transmitted.

16. A radio transmission system according to claim 1, characterized in that the bit length of the information which is to be transmitted, the transit time of the delay line of the receiver and the wobble period of the transmitter have a whole number relationship ratio to one another.

* * * * *